US012361301B2

(12) United States Patent
Tormasov et al.

(10) Patent No.: US 12,361,301 B2
(45) Date of Patent: Jul. 15, 2025

(54) SYSTEMS AND METHODS FOR CUSTOMIZING A USER WORKSPACE ENVIRONMENT USING A.I-BASED ANALYSIS

(71) Applicant: Acronis International GmbH, Schaffhausen (CH)

(72) Inventors: Alexander Tormasov, Moscow (RU); Serguei Beloussov, Costa Del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 1013 days.

(21) Appl. No.: 17/321,676

(22) Filed: May 17, 2021

(65) Prior Publication Data
US 2022/0309367 A1    Sep. 29, 2022

Related U.S. Application Data

(60) Provisional application No. 63/164,655, filed on Mar. 23, 2021.

(51) Int. Cl.
*G06N 5/04*    (2023.01)
*G06N 20/00*    (2019.01)
(52) U.S. Cl.
CPC .............. *G06N 5/04* (2013.01); *G06N 20/00* (2019.01)

(58) Field of Classification Search
CPC ................... G06N 5/04; G06N 20/00
See application file for complete search history.

(56) References Cited

U.S. PATENT DOCUMENTS

2015/0154361 A1*  6/2015  Barsoum ............... G16H 10/60
                                                    705/3
2016/0300144 A1* 10/2016  Santhanam ........... G06N 20/00

* cited by examiner

*Primary Examiner* — Pei Yong Weng
(74) *Attorney, Agent, or Firm* — ArentFox Schiff LLP; Michael Fainberg

(57) ABSTRACT

Disclosed herein are systems and method for customizing a user workspace environment using artificial intelligence-based analysis. In one exemplary aspect, a method comprises detecting user actions in a user workspace environment that provides access to a plurality of workspace elements. The method comprises generating a plurality of rules for customizing the user workspace environment, wherein each rule links a set of input parameters of a machine learning algorithm as criteria with an output user action and an output identifier of the workspace element, and wherein each rule assigns at least one customization action that (1) reduces an amount of steps to perform in the user workspace environment to access the workspace element associated with the output identifier and (2) reduces a processing time to perform the output user action. When a criterion is fulfilled, the method comprises executing a corresponding customization action that alters the user workspace environment.

18 Claims, 5 Drawing Sheets

SYSTEMS AND METHODS FOR CUSTOMIZING A USER WORKSPACE ENVIRONMENT USING A.I-BASED ANALYSIS

CROSS-REFERENCE TO RELATED APPLICATIONS

This application claims the benefit of U.S. Provisional Application No. 63/164,655, filed Mar. 23, 2021, which is herein incorporated by reference.

FIELD OF TECHNOLOGY

The present disclosure relates to the field of user interfaces, and, more specifically, to systems and methods for customizing a user workspace environment using artificial intelligence-based analysis.

BACKGROUND

Working with modern software is a complex organized process that requires frequent manual adjustment of various programs, configurations, user interfaces, etc. The complexity of a user's working environment has increased significantly, and a significant amount of time is spent on unproductive technical actions. A given program may require different setting adjustments depending on different contexts of usage and based on the requirements of other programs it interacts with. The operating system itself may require different settings depending on what programs the user plans to use.

Existing solutions usually lie in two planes. In the first plane, there is a responsive interface, in which an application allows the user to customize the necessary toolbars, remove unnecessary buttons and menu items, etc. The disadvantage of this solution is that it is not automated and that it only works within one program. It does not cover interactions between multiple applications.

In the second plane, there is the creation of ready-made and specially configured environments using virtual machine images. For example, one virtual machine may contain system configuration information and a set of applications required to work with different regional settings (e.g., language, measurement systems, etc.), while another virtual machine is configured to work safely with certain data by isolating it from the external network (e.g., by blocking ports, etc.). The problem with this solution is that it is essentially static. Once configured, the virtual environment is ill-suited to sudden changes in operating conditions. In addition, it does not enable "prediction" in advance of certain actions of the user.

SUMMARY

Aspects of the disclosure describe methods and systems for customizing a user workspace environment using artificial intelligence-based analysis.

In one exemplary aspect, a method may comprise detecting user actions in a user workspace environment that provides access to a plurality of workspace elements further comprising a plurality of files and a plurality of applications. The method may comprise logging, for each respective user action, data comprising a timestamp and an identifier of a respective workspace element on which the respective user action was performed. The method may comprise training a machine learning algorithm to output an identifier of a workspace element and user action based on an input timestamp, based on the logged data. The method may comprise generating a plurality of rules for customizing the user workspace environment, wherein each rule links a set of input parameters of the machine learning algorithm as criteria with an output user action and an output identifier of the workspace element, and wherein each rule assigns at least one customization action that (1) reduces an amount of steps to perform in the user workspace environment to access the workspace element associated with the output identifier and (2) reduces a processing time to perform the output user action, and in response to detecting that a criterion of a rule is fulfilled, the method may comprise executing a corresponding customization action that alters the user workspace environment.

In some aspects, the logged data further comprises device settings of a device running the user workspace environment at the timestamp, wherein the device settings include at least one of: (1) device location, (2) network connection, (3) memory usage, and (4) power usage.

In some aspects, training the machine learning algorithm comprises training the machine learning algorithm to output the identifier of the workspace element and the user action based on the input timestamp and input device settings.

In some aspects, training the machine learning algorithm comprises training the machine learning algorithm to output the identifier of the workspace element and the user action based on the input timestamp and an input sequence of user actions and workspace elements.

In some aspects, a customization access comprises at least one of (1) temporarily placing a file from the plurality of files in cache memory, (2) launching an application from the plurality of applications, (3) temporarily generating a shortcut of the file and/or the application on a user interface of the user workspace environment, (4) temporarily hiding other shortcuts of other files in the plurality of files and other applications in the plurality of applications on the user interface, (5) temporarily resizing the shortcut of the file and/or the application on the user interface for enhancing visual prominence, (6) freeing up memory usage in anticipation of the output user action.

In some aspects, the method may comprise detecting additional user actions in a given application of the user workspace environment and logging, for each respective user action, additional data comprising an additional timestamp and an identifier of a respective workspace sub-element of the given application. The method may comprise training the machine learning algorithm to output an additional identifier of a workspace sub-element and an additional user action based on an input timestamp, based on the logged additional data. The method may comprise generating an additional plurality of rules for customizing the given application, wherein each rule links the set of input parameters of the machine learning algorithm as the criteria with an output user action and an output identifier of the workspace sub-element, and wherein each rule assigns at least one customization action that (1) reduces an amount of steps to perform in the given application to access the workspace sub-element associated with the output identifier and (2) reduces a processing time to perform the output user action.

In some aspects, the method may comprise determining that the given application and another application are a same type of application, identifying workspace sub-elements shared between the given application and the another application, and copying, for the another application, a subset of the additional plurality of rules associated with the identified workspace sub-elements, wherein the subset is for customizing the another application.

In some aspects, the another application is in the user workspace environment.

In some aspects, the another application is in a different user workspace environment accessed by a user that accesses the user workspace environment.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for customizing a user workspace environment using artificial intelligence-based analysis. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The shortcomings described in the background section can be mitigated by the creation of a special algorithmic "layer" between the user and his/her working environment, which includes both a set of tools (e.g., applications) and all user data stored both locally and in remote (cloud) storages. The present disclosure describes a workspace manager, which serves as an analyzer of human behavior and actions coupled with a machine learning system. The workspace manager is configured to generate customized user interfaces within a user workspace environment.

This customization is motivated by a request anticipation program (e.g., anticipate that a user will access a program at a certain time and customize the user interface to make that program readily accessible). This may involve, for example, displaying any necessary windows and opening the programs required at a given time. For example, a user may typically work with documents in the morning hours, and the workspace manager may start all required software and ready all the document locations (like folders or cloud storages) to speed up user access in the morning. This may also involve customizing the look of applications and files. For example, the workspace manage may analyze user data in the context of usage, and then, depending on the situation enable quick selection of files through buttons or may exclude files from display. In addition, the workspace manager may automatically change background settings and system configuration. For example, when a user works remotely with some corporate environment, the manager may turn on the VPN.

Figure 1:
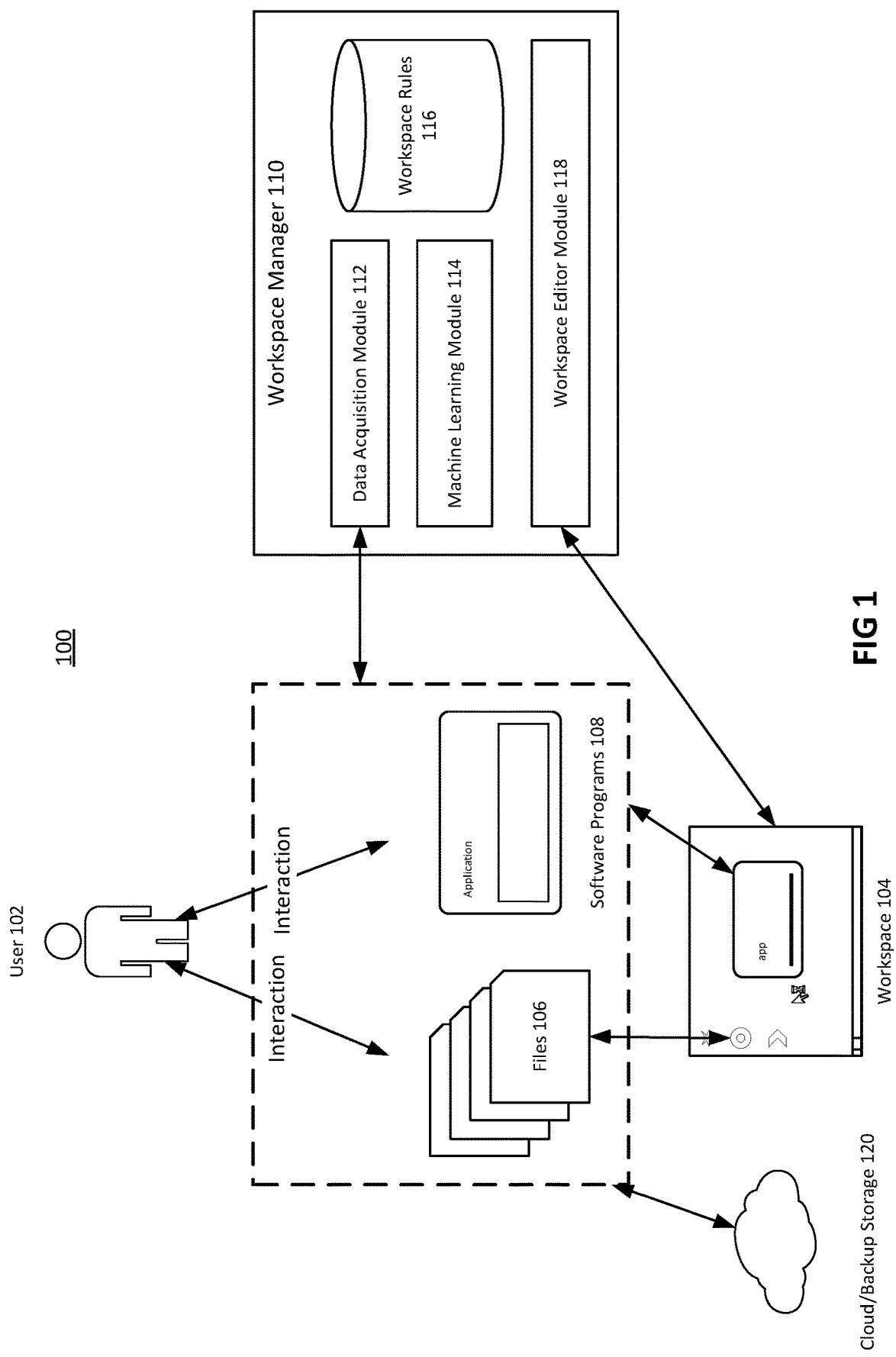
FIG. 1 is a block diagram illustrating a system for customizing a user workspace environment using artificial intelligence-based analysis.

FIG. 1 is a block diagram illustrating system 100 for customizing a user workspace environment (e.g., workspace 104) using artificial intelligence-based analysis. User 102 interacts with workspace 104, which may be a user interface of an operating system that enables access to a plurality of files 106 and a plurality of software programs 108. Files 106 and programs 108 are examples of workspace elements, which make up workspace 104. Workspace elements can also include taskbars, buttons, menus, containers, virtual machines, text fields, etc., that user 102 can access or modify. For example, user 102 may click on an application icon on the home screen of a workspace to start the application. Likewise, user 102 may click a close button to terminate the application. The application icon, the application, and the close button are each workspace elements.

Workspace manager 110 monitors the interactions of user 102 to learn how user 102 uses workspace 104, and customize workspace 104 such that the interactions are more efficient (e.g., processing takes less time and user 102 can get access to a particular workspace element in fewer steps than usual). Workspace manager 110 is a software application that comprises various modules including data acquisition module 112, machine learning module 114, workspace rules 116, and workspace editor module 118. Workspace manager 110 may run on a computing device on which workspace 104 is being executed, or may be split into a thin and thick client application. In the latter, the thin client application may forward data collected on the computing device to a remote server, and may receive customization actions to execute in response. The thick client application may comprise module 114, rules 116, and module 118, and may perform the processor-intensive actions.

In an exemplary aspect, workspace manager 110 may, via data acquisition module 112, detect user actions in a user workspace environment such as workspace 104 that provides access to a plurality of workspace elements such as files 106 and software programs 108. For example, user actions may involve opening a file using a certain application, closing an application, resizing a user interface of an application, activating a virtual private network (VPN), etc. Data acquisition module 112 may specifically monitor each user selection in workspace 104. A selection may involve double clicking on an application icon, clicking a button, clicking a dropdown item in a menu, etc. This monitoring process may take place over an initial usage period (e.g., two weeks) and may happen periodically (e.g., once every month) to account for new user habits.

Data acquisition module 112 may further log (e.g., in cloud/backup storage 120), for each detected respective user action, data comprising a timestamp and an identifier of a respective workspace element on which the respective user action was performed. For example, data acquisition module 112 may log that user 102 opened a file in files 106 on Monday at 3:52 pm. Subsequently, module 112 may log that user 102 closed the file in files 106 on Monday at 4:30 pm. These are at least two user actions where workspace manager 110 may determine a temporal habit depending on how often user 102 performs the user actions. If user 102 opens that particular file every Monday around 3:52 pm, workspace manager 110 may anticipate that the file selection will happen again on a subsequent Monday. Thus, machine learning module 114 trains a machine learning algorithm to output an identifier of a workspace element and user action based on an input timestamp, based on the logged data. For example, if the time (Monday, 3:52 pm) is provided as an input, the machine learning algorithm may output an identifier of the file (e.g., a filename) and a description of the user action performed (e.g., opened the file).

It should be noted that other criteria may be taken into account in addition to time. In some aspects, the logged data further comprises device settings of a device running the user workspace environment at the timestamp, wherein the device settings include at least one of: (1) device location, (2) network connection, (3) memory usage, and (4) power usage. Thus, training the machine learning algorithm comprises training the machine learning algorithm to output the identifier of the workspace element and the user action based on the input timestamp and input device settings. Here, in addition to logging (Monday, 3:52 pm), data acquisition module 112 may further log the GPS coordinates of the device on which workspace 104 is running, a network connection type (e.g., Wi-Fi network ID), memory usage (e.g., 4 GB used of 8 GB), and power usage (e.g., device battery is 40%). Workspace manager 110 may then anticipate that the user will perform the user action on a workspace element when the same time, location, network settings, etc., are recreated.

In some aspects, training the machine learning algorithm comprises training the machine learning algorithm to output the identifier of the workspace element and the user action based on the input timestamp and an input sequence of user actions and workspace elements. For example, instead of training the machine learning algorithm on a one-to-one basis (i.e., provide one timestamp or set of device settings at the given time represented by the timestamp), machine learning module 114 may be trained on a sequence of actions. For example, a sequence may include that user 102 opened a first file using a first application at time t1, opened a second file using the first application at time t2, and then moved each application window to a portion of workspace 104 (e.g., snapped them to each half of the workspace 104 U.I for simultaneous access). The machine learning algorithm may thus anticipate that if the first two actions are performed at a later time, the third action will also be performed. The output action may involve snapping both application windows to the respective halves of workspace 104. Another sequence may involve user 102 selecting a toolbar on the main user interface of workspace 104 (e.g., the home screen), scroll down toolbar options, and open an application. Here, if at a particular time of day, user 102 selects said toolbar and performs a scroll, the machine learning algorithm will anticipate that said application will be opened.

Workspace editor module 118 may then generate a plurality of rules for customizing workspace 104 and store them in workspace rules 116, which may be a database or a directory. Each rule may link a set of input parameters of the machine learning algorithm as criteria (e.g., an input timestamp, input device settings, and/or input sequences) with an output user action and an output identifier of the workspace element.

Each rule particularly assigns at least one customization action that (1) reduces an amount of steps to perform in the user workspace environment to access the workspace element associated with the output identifier and (2) reduces a processing time to perform the output user action. There may be three types of customization actions. The first type may involve automatically performing an anticipated user action. For example, the customization action may involve launching an application from the plurality of applications at a certain time because user 102 is expected to perform the launch at that time. Likewise, the customization action may involve launching a file, resizing an application window, connecting to a certain network connection, terminating a program, etc. The second type of customization action may be a visual change to the U.I of workspace 104. For example, workspace manager 110 may temporarily generate a shortcut of the file and/or the application on a user interface of the user workspace environment, may temporarily hide other shortcuts of other files in the plurality of files and other applications in the plurality of applications on the user interface, or may temporarily resize the shortcut of the file and/or the application on the user interface for enhancing visual prominence. The third type of customization action may be preparatory and may occur in the background. For example, workspace manager 110 may temporarily place a file from the plurality of files in cache memory and free up memory usage in anticipation of the output user action.

In terms of reducing the amount of steps to perform in the user workspace environment to access the workspace element associated with the output identifier, workspace editor module 118 may determine a number of selections it takes to access the workspace element. Suppose that an output user action is to open an application. In a conventional setting, to access the application from the main user interface of the user workspace environment, user 102 may need to select a toolbar on the user interface (e.g., press the start button), click "all applications," scroll down to find the application, and then select the application. This involves four steps. In another example, the application executable may be stored in a directory accessible directly from the main user interface of the user workspace environment. Accordingly, user 102 may need to double click on the directory and then select the application. This involves two steps. In either case, the fastest way to access the application would be to generate a shortcut of the application on the main user interface. This allows that application to be opened without additional steps (i.e., simply double-click from the main user interface). An even faster way to access the application is if it automatically launches without further user input.

In some aspects, automated launches may be performed if user 102 enables an automated launch option in module 118 (if disabled, the user may prefer that a shortcut to the application be generated instead because it is less invasive). In some aspects, automated launches may be performed instead of shortcut generation based on a level of confidence of the machine learning algorithm that the output user action will be performed. For example, machine learning algorithm may output a probability that the output user action is in fact going to be executed. Workspace editor module 118 may compare the probability against two threshold probabilities. The first threshold (e.g., 75%) represents a minimum probability for performing a customization action that is non-invasive (e.g., generating a shortcut on a user interface). The second threshold (e.g., 90%) is higher than the first threshold and represents a minimum probability for performing a customization action that directly performs the output user action (e.g., launching an application). Suppose that the probability is 80%. In this case, workspace editor module 118 may perform the former type of customization action. In the event that the probability is less than both thresholds, a customization action is not performed.

In terms of reducing processing time to perform an output user action, the customization action may additionally involve pre-loading certain files needed to launch an application. Thus, when the output user action is performed (i.e., the launch), the processing time is less than the normal time of loading all launch files. In some aspects, the files associated with the application may be moved to a cache to reduce processing times. In some aspects, module 118 may record an amount of processing time to execute a user action. Module 118 may then simulate execution of the user action when certain pre-loading configurations are executed. For example, module 118 may determine the processing time when certain launch files are moved into a cache. In response to determining that the processing time is reduced, module 118 may include the changes that led to the lower processing time in the customization action. For example, in the case of launching an application, a customization action may involve generating a shortcut of the application and moving certain launch files into a cache.

Workspace editor module 118 may then monitor whether workspace rules 116 should be executed. In response to detecting that a criterion of a rule is fulfilled, workspace editor module 118 may execute a corresponding customization action that alters the user workspace environment.

Figure 2:
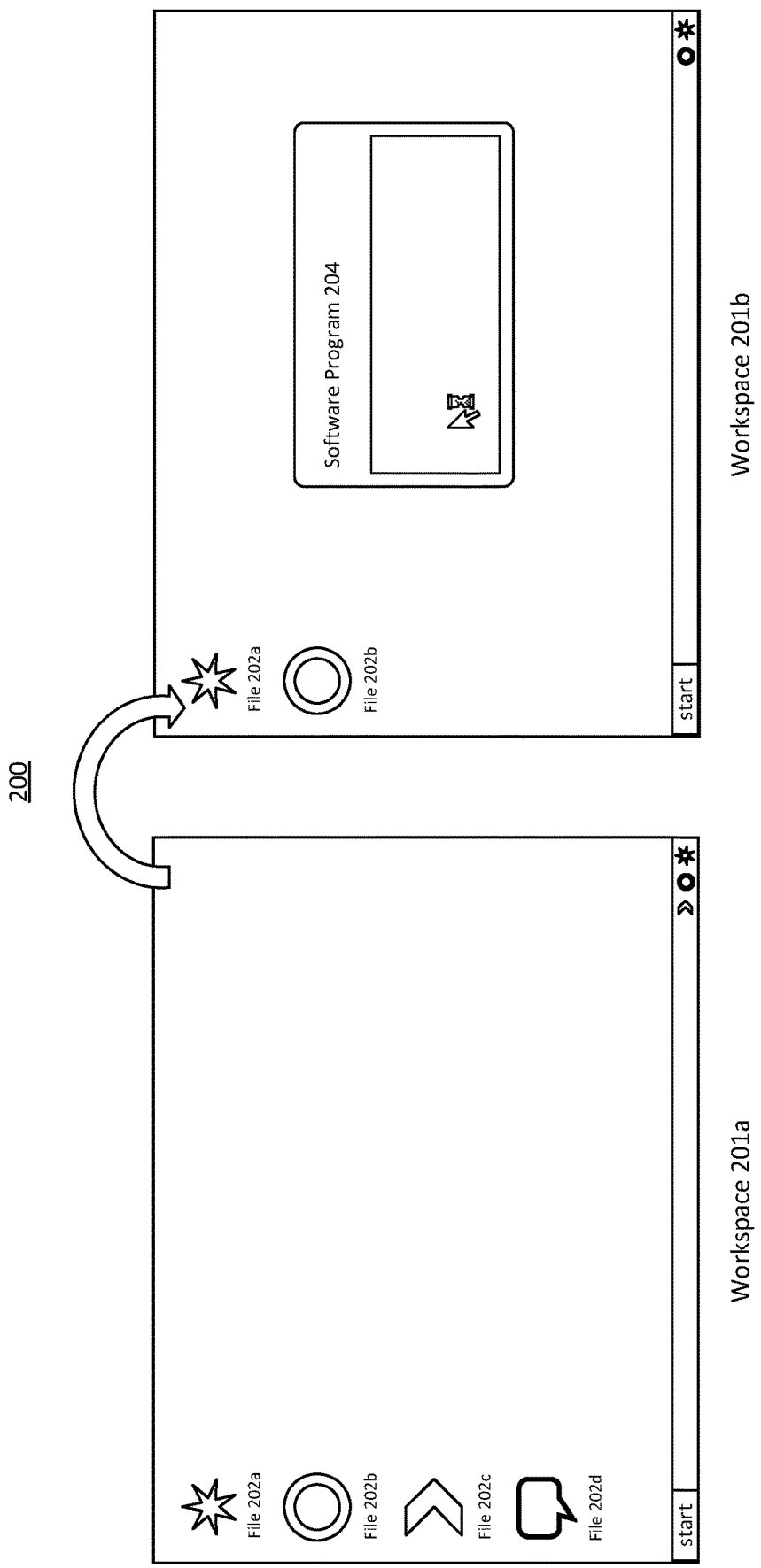
FIG. 2 is a diagram illustrating a workspace that has been customized.

FIG. 2 is diagram 200 illustrating workspace 201a that has been customized. Workspace manager 110 may have a rule that indicates that at a certain time, visual icons of file 202a and file 202b are to be made more prominent because user 102 has historically accessed files 202a and 202b. Accordingly, the customization action of workspace 201a involves temporarily hiding all other icons (e.g., file 202c and file 202d). In addition, another rule may indicate that at that time, software program 204 should be launched (e.g., because the user has frequently used program 204 at that time in the past). Workspace 201b represents what workspace 201a may look like when workspace editor module 118 executes the customization actions.

In some aspects, workspace manager 110 may also analyze user interactions with workspace sub-elements. A sub-element may be a component of an application, container, or virtual machine (i.e., any component other than the ones directly on the home user interface of a workspace). Data acquisition module 112 may detect additional user actions in a given application of the user workspace environment. For example, the given application may be a web browser and a user action may be opening a tab to access a particular website. Data acquisition module 112 may log, for each respective user action, additional data comprising an additional timestamp and an identifier of a respective workspace sub-element of the given application. For example, the workspace sub-element may be a "new tab" button.

Machine learning module 114 may train the machine learning algorithm to output an additional identifier of a workspace sub-element and an additional user action based on an input timestamp, based on the logged additional data. In some aspects, the logged data may include device settings and/or an input sequence as well. Workspace editor module 118 may then generate an additional plurality of rules for customizing the given application/container/virtual machine. Here, each rule may link the set of input parameters of the machine learning algorithm as the criteria with an output user action and an output identifier of the workspace sub-element. Furthermore, each rule may assign at least one customization action that (1) reduces an amount of steps to perform in the given application to access the workspace sub-element associated with the output identifier and (2) reduces a processing time to perform the output user action.

Figure 3:
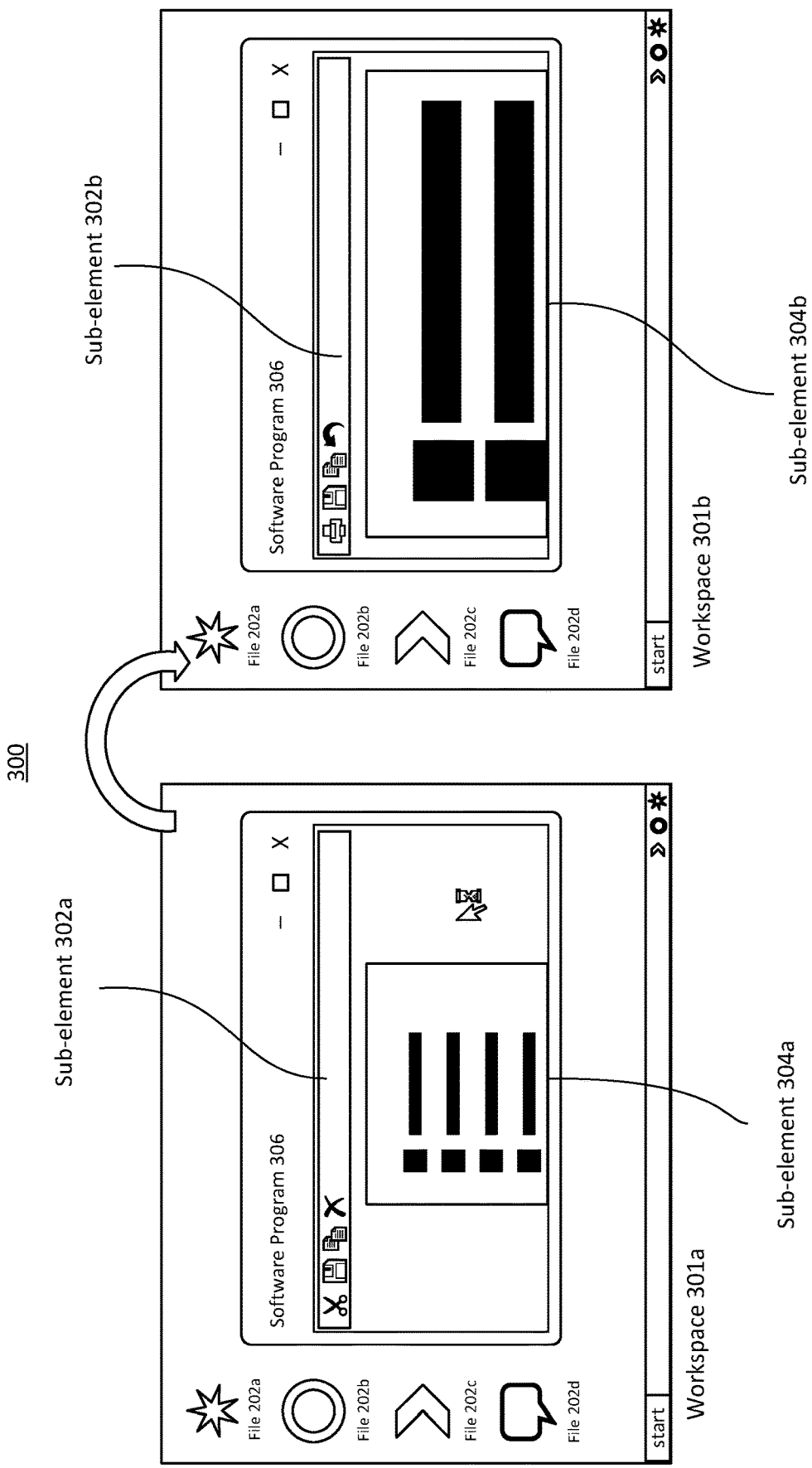
FIG. 3 is a diagram illustrating an application interface that has been customized within a workspace.

FIG. 3 is diagram 300 illustrating an application interface that has been customized within workspace 301a. For example, by default, software program 306 may launch as shown in workspace 301a. Suppose that program 306 is a word editing software. Sub-element 302a may be a taskbar with various buttons. Sub-element 304a may be a document that is being edited. In the past, user 102 may have zoomed into that particular document for improved viewing. Accordingly, workspace editor module 118 may execute a customization action that zooms into the particular document upon launch of the file (as shown in sub-element 304b in workspace 301b). It should be noted that a different file may not be launched at the same zoom level because the user may not have historically zoomed into the file. In terms of sub-element 302a, the user may use only certain buttons such as a print button and an undo button over a plurality of historical usage sessions of program 306. Accordingly, workspace editor module 118 may remove the buttons that are not used and replace them with the buttons that are used (as shown in sub-element 302b in workspace 301b).

It should be noted that workspace editor module 118 may learn user tendencies in one application and apply them to a different application of the same type. Suppose that program 306 is a web browsing application (e.g., Google Chrome). A user may generate bookmarks to various websites, adjust the toolbars of the application, adjust various settings (e.g., whether to block ads, enable cookies, etc.). Workspace editor module 118 may determine that the given application (e.g., program 306) and another application are a same type of application. For example, module 118 may refer to a categorized database that lists various applications and their types. Based on the database information, module 118 may determine that the another application (e.g., Mozilla Firefox) and the given application (e.g., Google Chrome) are both web browsers. Accordingly, module 118 may proceed to identify workspace sub-elements shared between the given application and the another application (e.g., bookmarking capabilities, toolbars, configurations, etc.), and copy, for the another application, a subset of the additional plurality of rules associated with the identified workspace sub-elements. For example, if a rule for program 306 involved launching a certain website during startup, because Mozilla Firefox is capable of launching websites at startup, module 118 may apply the same rule to Mozilla Firefox. As a result, even if the user accesses different applications of the same type, their preferences will be carried over.

In some aspects, the another application is in the user workspace environment. For example, both Google Chrome and Mozilla Firefox may be accessed on the same OS and device. In some aspects, the another application is in a different user workspace environment accessed by a user that accesses the user workspace environment. For example, the different user workspace environment may be a virtual machine on the same device running the user workspace environment. In some aspects, the different user workspace environment may be on a different device of the user. In this case, module 118 may collect data associated with the user across multiple devices and store the data in central location from which module 118 trains the machine learning algorithm.

Figure 4:
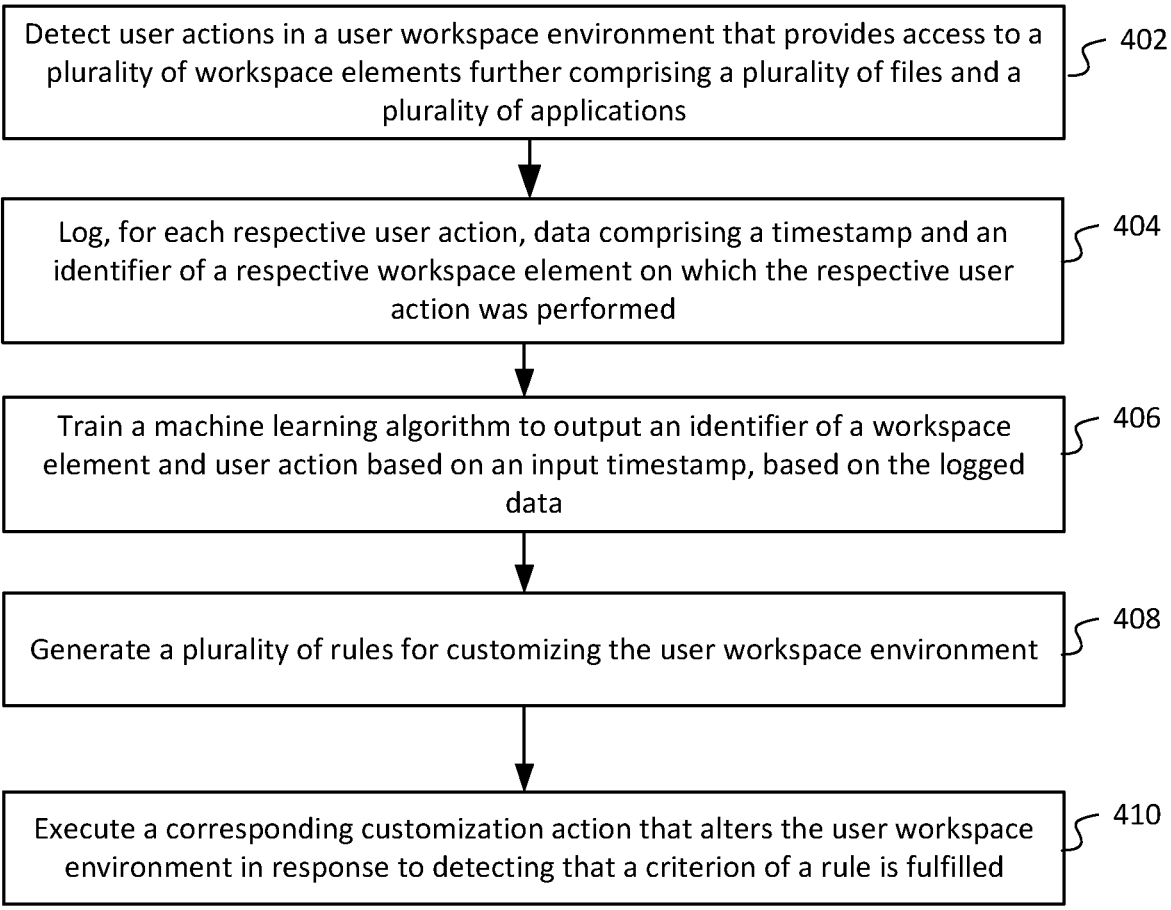
FIG. 4 illustrates a flow diagram of a method for customizing a user workspace environment using artificial intelligence-based analysis.

FIG. 4 illustrates a flow diagram of method 400 for customizing a user workspace environment using artificial intelligence-based analysis. At 402, data acquisition module 112 detects user actions in a user workspace environment (e.g., workspace 104) that provides access to a plurality of workspace elements further comprising a plurality of files (e.g., files 106) and a plurality of applications (e.g., programs 108).

At 404, data acquisition module 112 logs, for each respective user action, data comprising a timestamp and an identifier of a respective workspace element on which the respective user action was performed. At 406, machine learning module 114 trains a machine learning algorithm to output an identifier of a workspace element and user action based on an input timestamp, based on the logged data.

At 408, workspace editor module 118 generates a plurality of rules (e.g., rules 116) for customizing the user workspace environment, wherein each rule links a set of input parameters of the machine learning algorithm as criteria with an output user action and an output identifier of the workspace element, and wherein each rule assigns at least one customization action that (1) reduces an amount of steps to perform in the user workspace environment to access the workspace element associated with the output identifier and (2) reduces a processing time to perform the output user action. At 410, workspace manager 110 executes a corresponding customization action that alters the user workspace environment in response to detecting that a criterion of a rule is fulfilled.

Figure 5:
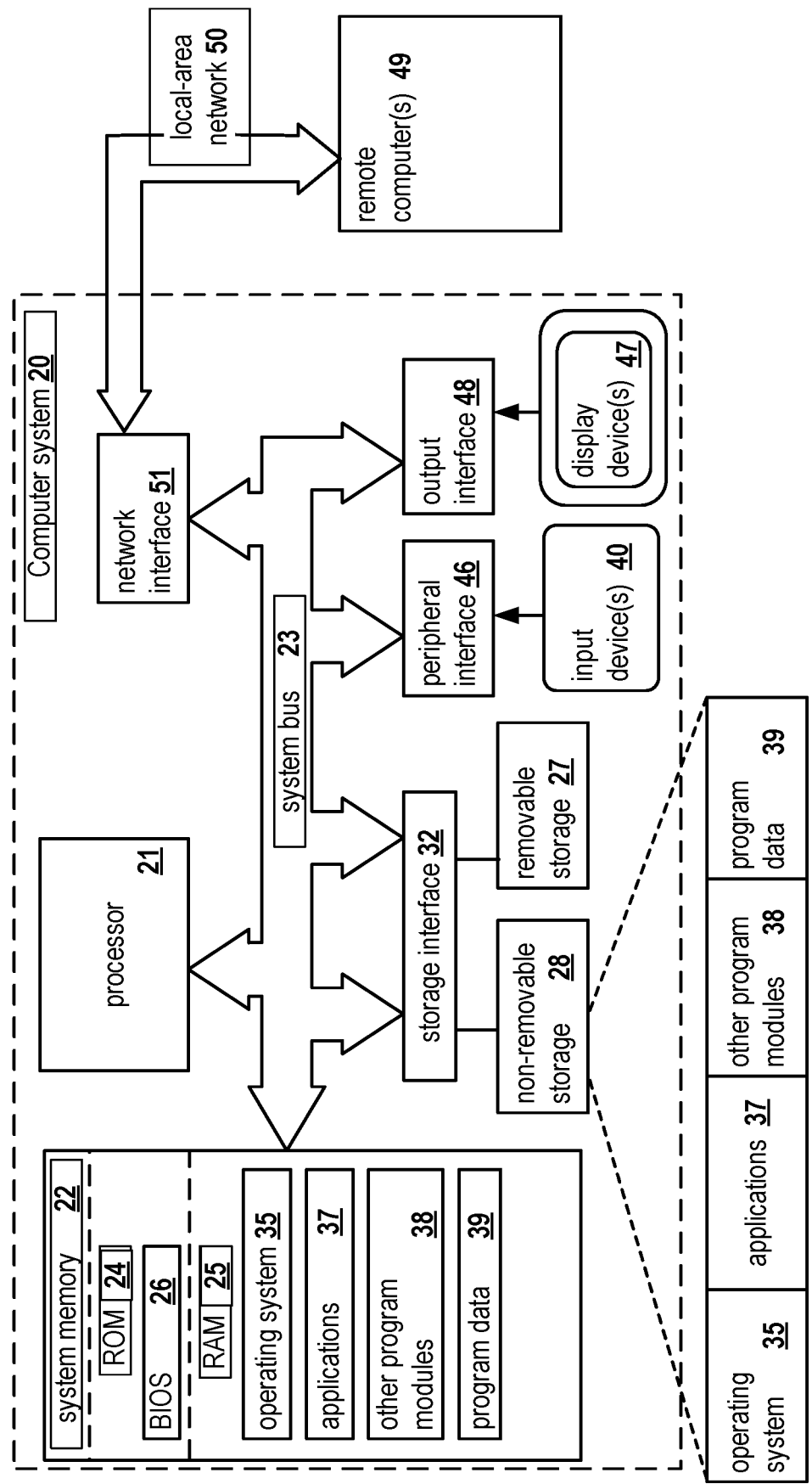
FIG. 5 presents an example of a general-purpose computer system on which aspects of the present disclosure can be implemented.

FIG. 5 is a block diagram illustrating a computer system 20 on which aspects of systems and methods for customizing a user workspace environment using artificial intelligence-based analysis may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for customizing a user workspace environment, the method comprising:
   detecting user actions in a user workspace environment that provides access to a plurality of workspace elements further comprising a plurality of files and a plurality of applications;
   logging, for each respective user action, data comprising a timestamp and an identifier of a respective workspace element on which the respective user action was performed;
   identifying based on the logged data one or more sequences of user actions that provide access to the plurality of workspace elements at a specified day and/or time, and, for each sequence of user actions determining (1) a number of steps performed by the user to access a particular workspace element, and/or (2) a processing time to perform the sequence of user actions;

training a machine learning algorithm, based on a set of input parameters including the one or more sequences of user actions and associated logged data, to output a probability of a user action that provides access to a particular workspace element at a particular day and/or time;

generating a plurality of rules for automatically customizing the user workspace environment, wherein each rule links the set of input parameters of the machine learning algorithm as criteria with the output of the machine learning algorithm, including an output user action and an output identifier of the workspace element, and wherein each rule assigns at least one customization action that (1) reduces the number of steps to perform in the user workspace environment to access the workspace element associated with the output identifier and/or (2) reduces the processing time to perform the output user action; and in response to detecting that a criterion of a rule is fulfilled, including the probability of the user action that provides access to the particular workspace element the user workspace environment at the particular day and/or time exceeds a threshold, executing a corresponding customization action of the rule that automatically alters the user workspace environment.

2. The method of claim 1, wherein the logged data further comprises device settings of a device running the user workspace environment at the timestamp, wherein the device settings include at least one of: (1) device location, (2) network connection, (3) memory usage, and (4) power usage.

3. The method of claim 2, wherein training the machine learning algorithm comprises training the machine learning algorithm to output the identifier of the workspace element and the user action based on the input timestamp and input device settings.

4. The method of claim 1, wherein a customization access comprises at least one of:
(1) temporarily placing a file from the plurality of files in cache memory,
(2) automatically launching an application from the plurality of applications,
(3) temporarily generating a shortcut of the file and/or the application on a user interface of the user workspace environment,
(4) temporarily hiding other shortcuts of other files in the plurality of files and other applications in the plurality of applications on the user interface,
(5) temporarily resizing the shortcut of the file and/or the application on the user interface for enhancing visual prominence,
(6) freeing up memory usage in anticipation of the output user action.

5. The method of claim 1, further comprising:
detecting additional user actions in a given application of the user workspace environment;
logging, for each respective user action, additional data comprising an additional timestamp and an identifier of a respective workspace sub-element of the given application;
training the machine learning algorithm based on the logged additional data to output an additional identifier of a workspace sub-element and an additional user action based on an input timestamp;
generating an additional plurality of rules for customizing the given application, wherein each rule links the set of input parameters of the machine learning algorithm as the criteria with an output user action and an output identifier of the workspace sub-element, and wherein each rule assigns at least one customization action that (1) reduces a number of steps to perform in the given application to access the workspace sub-element associated with the output identifier and (2) reduces a processing time to perform the output user action.

6. The method of claim 5, further comprising:
determining that the given application and another application are a same type of application;
identifying workspace sub-elements shared between the given application and the another application; and
copying, for the another application, a subset of the additional plurality of rules associated with the identified workspace sub-elements, wherein the subset is for customizing the another application.

7. The method of claim 6, wherein the another application is in the user workspace environment.

8. The method of claim 6, wherein the another application is in a different user workspace environment accessed by a user that accesses the user workspace environment.

9. A system for customizing a user workspace environment, the system comprising: a hardware processor configured to:
detect user actions in a user workspace environment that provides access to a plurality of workspace elements further comprising a plurality of files and a plurality of applications;
log, for each respective user action, data comprising a timestamp and an identifier of a respective workspace element on which the respective user action was performed;
identify based on the logged data one or more sequences of user actions that provide access to the plurality of workspace elements at a specified day and/or time, and, for each sequence of user actions determining (1) a number of steps performed by the user to access a particular workspace element, and/or (2) a processing time to perform the sequence of user actions;
train a machine learning algorithm, based on a set of input parameters including the one or more sequences of user actions and associated logged data, to output a probability of a user action that provides access to a particular workspace element at a particular day and/or time;
generate a plurality of rules for automatically customizing the user workspace environment, wherein each rule links the set of input parameters of the machine learning algorithm as criteria with the output of the machine learning algorithm, including an output user action and an output identifier of the workspace element, and wherein each rule assigns at least one customization action that (1) reduces the number of steps to perform in the user workspace environment to access the workspace element associated with the output identifier and/or (2) reduces the processing time to perform the output user action; and
in response to detecting that a criterion of a rule is fulfilled, including the probability of the user action that provides access to the particular workspace element the user workspace environment at the particular day and/or time exceeds a threshold, execute a corresponding customization action of the rule that automatically alters the user workspace environment.

10. The system of claim 9, wherein the logged data further comprises device settings of a device running the user workspace environment at the timestamp, wherein the device settings include at least one of: (1) device location, (2) network connection, (3) memory usage, and (4) power usage.

11. The system of claim 10, wherein the hardware processor is further configured to train the machine learning algorithm to output the identifier of the workspace element and the user action based on the input timestamp and input device settings.

12. The system of claim 9, wherein a customization access comprises at least one of:
   (1) temporarily placing a file from the plurality of files in cache memory,
   (2) automatically launching an application from the plurality of applications,
   (3) temporarily generating a shortcut of the file and/or the application on a user interface of the user workspace environment,
   (4) temporarily hiding other shortcuts of other files in the plurality of files and other applications in the plurality of applications on the user interface,
   (5) temporarily resizing the shortcut of the file and/or the application on the user interface for enhancing visual prominence,
   (6) freeing up memory usage in anticipation of the output user action.

13. The system of claim 9, wherein the hardware processor is further configured to:
   detect additional user actions in a given application of the user workspace environment;
   log, for each respective user action, additional data comprising an additional timestamp and an identifier of a respective workspace sub-element of the given application;
   train the machine learning algorithm based on the logged additional data to output an additional identifier of a workspace sub-element and an additional user action based on an input timestamp;
   generate an additional plurality of rules for customizing the given application, wherein each rule links the set of input parameters of the machine learning algorithm as the criteria with an output user action and an output identifier of the workspace sub-element, and wherein each rule assigns at least one customization action that (1) reduces an amount of steps to perform in the given application to access the workspace sub-element associated with the output identifier and (2) reduces a processing time to perform the output user action.

14. The system of claim 13, wherein the hardware processor is further configured to:
   determine that the given application and another application are a same type of application;
   identify workspace sub-elements shared between the given application and the another application; and
   copy, for the another application, a subset of the additional plurality of rules associated with the identified workspace sub-elements, wherein the subset is for customizing the another application.

15. The system of claim 14, wherein the another application is in the user workspace environment.

16. The system of claim 14, wherein the another application is in a different user workspace environment accessed by a user that accesses the user workspace environment.

17. A non-transitory computer readable medium storing thereon computer executable instructions for customizing a user workspace environment, including instructions for:
   detecting user actions in a user workspace environment that provides access to a plurality of workspace elements further comprising a plurality of files and a plurality of applications;
   logging, for each respective user action, data comprising a timestamp and an identifier of a respective workspace element on which the respective user action was performed;
   identifying based on the logged data one or more sequences of user actions that provide access to the plurality of workspace elements at a specified day and/or time, and, for each sequence of user actions determining (1) a number of steps performed by the user to access a particular workspace element, and/or (2) a processing time to perform the sequence of user actions;
   training a machine learning algorithm, based on a set of input parameters including the one or more sequences of user actions and associated logged data, to output a probability of a user action that provides access to a particular workspace element at a particular day and/or time;
   generating a plurality of rules for automatically customizing the user workspace environment, wherein each rule links the set of input parameters of the machine learning algorithm as criteria with the output of the machine learning algorithm, including an output user action and an output identifier of the workspace element, and wherein each rule assigns at least one customization action that (1) reduces the number of steps to perform in the user workspace environment to access the workspace element associated with the output identifier and/or (2) reduces the processing time to perform the output user action; and
   in response to detecting that a criterion of a rule is fulfilled, including the probability of the user action that provides access to the particular workspace element the user workspace environment at the particular day and/or time exceeds a threshold, executing a corresponding customization action of the rule that automatically alters the user workspace environment.

18. The non-transitory computer readable medium of claim 17, wherein the logged data further comprises device settings of a device running the user workspace environment at the timestamp, wherein the device settings include at least one of: (1) device location, (2) network connection, (3) memory usage, and (4) power usage.

* * * * *